United States Patent [19]

Binder et al.

[11] Patent Number: 5,601,948
[45] Date of Patent: Feb. 11, 1997

[54] GAS PLASMA TREATMENT OF CATHODES TO IMPROVE CELL PERFORMANCE

[75] Inventors: Michael Binder, Brooklyn, N.Y.; Robert J. Mammone, South Plainfield; William L. Wade, Jr., Neptune, both of N.J.

[73] Assignee: The United States of America as represented by the Secretary of the Army, Washington, D.C.

[21] Appl. No.: 420,268

[22] Filed: Apr. 11, 1995

[51] Int. Cl.$^6$ ..................................................... H01M 4/04
[52] U.S. Cl. ........................... 429/218; 429/224; 216/13; 216/75; 216/81
[58] Field of Search ..................... 429/211, 218, 429/222, 224, 229; 216/13, 75, 81

[56] References Cited

U.S. PATENT DOCUMENTS

| | | | |
|---|---|---|---|
| 3,642,513 | 2/1972 | Sach et al. | 216/61 X |
| 4,440,836 | 4/1984 | Bailey | 429/218 X |
| 4,520,084 | 5/1985 | Tinker et al. | 429/218 X |
| 4,526,881 | 7/1985 | Binder et al. | 502/101 |
| 4,543,305 | 9/1985 | Binder et al. | 429/101 |
| 5,328,782 | 7/1994 | Binder et al. | 429/101 |

FOREIGN PATENT DOCUMENTS

| | | | |
|---|---|---|---|
| 53-20769 | 2/1978 | Japan | 216/75 |
| 61-314348 | 10/1986 | Japan | 216/81 |

*Primary Examiner*—Stephen Kalafut
*Attorney, Agent, or Firm*—Michael Zelenka; William H. Anderson

[57] ABSTRACT

A porous carbon black or manganese dioxide cathode, or a lithium, magnesium, calcium, zinc, or cadmium anode, is treated under vacuum with a gas plasma. The treated electrode is suitable for inclusion in a nonaqueous electrolyte cell and improves cell performance.

14 Claims, No Drawings

1

GAS PLASMA TREATMENT OF CATHODES TO IMPROVE CELL PERFORMANCE

GOVERNMENT INTEREST

The invention described herein may be manufactured, used, and licensed by or for the Government for governmental purposes without the payment to us of any royalty thereon.

FIELD OF THE INVENTION

This invention relates in general to a method of treating an electrode, and in particular, to a method of treating porous carbon black cathode material for a lithium-based electrical cell with a low-pressure gas plasma to improve cell performance.

BACKGROUND OF THE INVENTION

Lithium-based battery systems having carbon black or manganese dioxide cathodes, and whose electrolytes have the general formula $R_pO_rX_t$, where R may be sulfur, carbon, or silicon; O is oxygen; and X may be fluorine, chlorine, bromine, or iodine, and $p>0$, $r>0$, and $t>0$, suffer from the problem that, after storage, the buildup of a passivating film on the anode results in reduced voltage under load and a time delay before the battery reaches steady-state output voltage.

One approach for overcoming this problem is the addition of various chemicals to the electrolyte. Another approach is the application of special coatings to the anode. These procedures are time-consuming during manufacture and costly.

Yet another approach is to modify the materials used in making the cathode and anode by washing them with acetone or methanol, as described in U.S. Pat. Nos. 4,526,881 and 4,543,305. This procedure removes impurities from the carbon black from which the cathode is made. Such impurities, if not removed, migrate to the anode, forming a passivating film on the anode and causing a low output voltage and a delay in reaching a steady-state voltage. The drawback of this approach is the fire hazard inherent in the washing with acetone and methanol, and the potential exposure of personnel to toxic concentrations of acetone or methanol vapor.

These disadvantages are overcome by a method, disclosed in the inventors' U.S. Pat. No. 5,328,782, whereby the cathode material is exposed to a low-pressure, room-temperature gas plasma. The method is for an electrical cell having a lithium anode, a carbon black cathode, and sulfur dioxide, acetonitrile, and lithium bromide as electrolyte.

SUMMARY OF THE INVENTION

It has now been discovered that the carbon black cathode material, either in powder form or formed into a cathode, may be treated with a gas plasma in accordance with this invention, and used in making an electrical cell having a conductive electrolyte consisting of acetonitrile, lithium bromide, and a compound of the general formula $R_pO_rX_t$, where R may be sulfur, carbon, or silicon; O is oxygen; X may be fluorine, chlorine, bromine, or iodine; and $p>0$, $r>0$, and $t>0$. The electrolyte may also consist of any other water-soluble salt in conjunction with a compound of the general formula $R_pO_rX_t$. The result of this treatment is an increase in cell voltage and a decrease of the time required for the cell to reach a steady-state voltage. It is believed that the gas plasma treatment method of this invention removes the impurities initially contained in the carbon black cathode material, thereby preventing such impurities from migrating to the anode of the electrical cell, forming a passivating film thereon, and causing a low output voltage and a long time delay in reaching a steady-state output voltage.

DETAILED DESCRIPTION OF THE INVENTION

In the process of the present invention, either carbon black powder, or porous carbon black electrodes, are subjected under vacuum (20 to 250 millitorr) at room temperature to a gas plasma. For example, fully fabricated, tabbed porous, 90% Shawinigan black, 10% Teflon@ cathodes (22"×1.5"×0.030") are exposed in a plasma etcher for 0.5 seconds to 5 minutes, preferably for about 3 to 4 minutes, in a reactive gas atmosphere of 100% oxygen; 100% ammonia; or a mixture of 90–99% carbon tetrafluoride, the remainder oxygen; to a gas plasma at 2.5 millitorr in a plasma etcher at plasma power levels of 0.002 watts/cm³. The cathodes are then dried, rolled, and spirally wound with glass filter separator and lithium foil into "D" sized cells. These cells are filled with electrolyte consisting of acetonitrile, lithium bromide, and a compound having the general formula $R_pO_rX_t$, where R may be sulfur, carbon, or silicon; O is oxygen; X may be fluorine, chlorine bromine, or iodine; and $p>0$, $r>0$, and $t>0$. Most frequently, $SOCl_2$, $SO_2Cl_2$, $SOClBr$, $SO_2ClBr$, $SOBr_2$, or $COCl_2$ are used. The cells are allowed to equilibrate for two days and pulsed at 10.5 amperes at room temperature.

The gas plasma treatment of this invention also improves the performance of electrical cells having manganese dioxide cathodes. Furthermore, the gas plasma treatment by the method of this invention of anode material, such as lithium, magnesium, calcium, zinc, and cadmium, also improves cell performance.

The reason for the gas plasma treatment of electrodes with oxygen is that it oxygenates surface functional groups on the cathode materials into functional groups that are more amenable to charge transfer reactions. Gas plasma treatment with ammonia forms basic-type functional groups on the electrode surface. Carbon tetrafluoride fluorinates functional groups on the electrode material. The effectiveness of the gas plasma treatment in improving cell performance is illustrated by the following example.

EXAMPLE 1

"C" sized lithium oxyhalide cells (lithium sulfuryl chloride) were assembled with untreated porous carbon cathodes and with identical porous carbon electrodes that had undergone treatment with gas plasmas as previously described. The cells were stored at 70° C. for one month. They were then discharged at 3 amperes at −30° C. Cells containing treated cathodes had a voltage delay of about 3 minutes, whereas cells with untreated cathodes had a voltage delay of about 5 minutes.

While it will be apparent that the invention herein described is well calculated to achieve the benefits and advantages hereinabove set forth, it will be appreciated that the invention is susceptible to modification, variation, and change without departing from the spirit thereof.

What is claimed is:

1. A method of forming an electric cell comprising the steps of:

(b) providing an electrode material wherein the electrode material is porous carbon black;

(c) inserting the electrode material into a plasma etcher;

(d) filling the plasma etcher with a reactive gas mixture;

(e) exposing the electrode material to a gas plasma for from 0.5 seconds to 5 minutes; and (f) installing the electrode material in an electric cell having an electrolyte of the general formula $R_pO_rX_t$, where R is selected from the group consisting of sulfur, carbon and silicon; O is oxygen; and X is selected from the group consisting of fluorine, chlorine, bromine, and iodine; and the subscripts p, r, and t are greater than 0.

2. The process of claim 1 wherein the electrode material is formed into a solid electrode.

3. A method of forming an electric cell comprising the steps of:

(a) providing an electrode material wherein the electrode material is manganese dioxide;

(b) inserting the electrode material into a plasma etcher;

(c) filling the plasma etcher with a reactive gas mixture;

(d) exposing the electrode material to a gas plasma for from 0.5 seconds to 5 minutes; and (e) installing the electrode material in an electric cell having an electrolyte of the general formula $R_pO_rX_t$, where R is selected from the group consisting of sulfur, carbon, and silicon; O is oxygen; and X is selected from the group consisting of fluorine, chlorine, bromine, and iodine; and the subscripts p, r, and t are greater than 0.

4. The process of claim 1 wherein the reactive gas mixture is selected from the group consisting of oxygen, ammonia, and a mixture of carbon tetrafluoride and oxygen.

5. The process of claim 1 wherein the treatment of electrode material is conducted under a vacuum from 20 to 250 millitorr.

6. The process of claim 4 wherein the mixture of carbon tetrafluoride and oxygen contains from 90 to 99 percent by volume of carbon tetrafluoride.

7. The process of claim 1 wherein the electrolyte is selected from the group consisting of $SOCl_2$, $SO_2Cl_2$, $SOClBr$, $SO_2ClBr$, $SOBr_2$, and $COCl_2$.

8. An electric cell made by the method of claim 1.

9. The cell of claim 8 wherein the electrode material is formed into a solid electrode.

10. An electric cell made by the method of claim 3.

11. The cell of claim 8 wherein the reactive gas mixture is selected from the group consisting of oxygen, ammonia, and a mixture of carbon tetrafluoride and oxygen.

12. The cell of claim 8 wherein the treatment of electrode material is conducted under a vacuum from 20 to 250 millitorr.

13. The cell of claim 11 wherein the mixture of carbon tetrafluoride and oxygen contains from 90 to 99 percent by volume of carbon tetrafluoride.

14. The cell of claim 8 wherein the electrolyte is selected from the group consisting of $SOCl_2$, $SO_2Cl_2$, $SOClBr$, $SO_2ClBr$, $SOBr_2$, and $COCl_2$.

* * * * *